(12) United States Patent
McNutt et al.

(10) Patent No.: US 12,010,210 B1
(45) Date of Patent: Jun. 11, 2024

(54) DETERMINING CRYPTOGRAPHIC QUANTUM-SAFETY FOR NETWORK ASSETS

(71) Applicant: FORESCOUT TECHNOLOGIES, INC., San Jose, CA (US)

(72) Inventors: Robert McNutt, Cream Ridge, NJ (US); Daniel Ricardo dos Santos, Eindhoven (NL)

(73) Assignee: Forescout Technologies, Inc., San Jose, CA (US)

(*) Notice: Subject to any disclaimer, the term of this patent is extended or adjusted under 35 U.S.C. 154(b) by 0 days.

(21) Appl. No.: 18/370,672

(22) Filed: Sep. 20, 2023

(51) Int. Cl.
*H04L 9/06* (2006.01)
*H04L 9/08* (2006.01)

(52) U.S. Cl.
CPC .............. *H04L 9/06* (2013.01); *H04L 9/0852* (2013.01)

(58) Field of Classification Search
CPC ................................ H04L 9/06; H04L 9/0852
See application file for complete search history.

(56) References Cited

U.S. PATENT DOCUMENTS

| | | | | |
|---|---|---|---|---|
| 11,322,050 B1* | 5/2022 | Arbajian | ................... | G09C 1/00 |
| 11,363,072 B1* | 6/2022 | Relan | ...................... | G06F 9/451 |
| 11,477,017 B2* | 10/2022 | Newton | ................ | H04L 9/0825 |
| 11,727,829 B1* | 8/2023 | Arbajian | ................... | H04L 9/14 |
| | | | | 380/28 |
| 2020/0328886 A1* | 10/2020 | Newton | ................ | H04L 9/0825 |
| 2021/0281404 A1* | 9/2021 | Kampanakis | ......... | H04L 63/205 |
| 2022/0103592 A1* | 3/2022 | Semel | ..................... | H04L 63/20 |
| 2023/0119304 A1* | 4/2023 | Nagaratnam | ......... | H04L 9/0855 |
| | | | | 380/255 |
| 2023/0254132 A1* | 8/2023 | Ramanathan | ......... | H04L 9/0869 |
| | | | | 380/28 |

* cited by examiner

*Primary Examiner* — Baotran N To
(74) *Attorney, Agent, or Firm* — Womble Bond Dickinson (US) LLP

(57) ABSTRACT

A system includes a processing device, operatively coupled to memory, to obtain one or more ciphers that are supported by a device that is coupled to a network, determine, by the processing device, a value associated with the device, based on whether each of the one or more ciphers that are supported by the device is quantum-safe, and generate a notification based on the value.

19 Claims, 8 Drawing Sheets

NMAP SSL-ENUM CIPHERS 504

```
PORT     STATE SERVICE REASON
443/tcp open  https   syn-ack
| ssl-enum-ciphers:
|   TLSv1.0:
|     ciphers:
|       TLS_ECDHE_ECDSA_WITH_AES_128_CBC_SHA (secp256r1) - A
|       TLS_RSA_WITH_RC4_128_MD5 (rsa 2048) - C
|     compressors:
|       NULL
|     cipher preference: server
|   TLSv1.2:
|     ciphers:
|       TLS_ECDHE_ECDSA_WITH_AES_128_GCM_SHA256 (secp256r1) - A
|       TLS_RSA_WITH_RC4_128_MD5 (rsa 2048) - C
|     compressors:
|       NULL
|     cipher preference: server
|_    least strength: C
```

SSH2-ENUM-ALGOS 506

```
PORT   STATE SERVICE
22/tcp open  ssh
| ssh2-enum-algos:
|   kex_algorithms (2)
|       diffie-hellman-group-exchange-sha256
|       diffie-hellman-group-exchange-sha1
|   server_host_key_algorithms (2)
|       ssh-rsa
|       ssh-dss
|   encryption_algorithms (4)
|       aes128-ctr
|       aes192-ctr
|       aes256-ctr
|       arcfour256
|       rijndael-cbc@lysator.liu.se
|   mac_algorithms (2)
|       hmac-sha1
|       hmac-ripemd160
|   compression_algorithms (2)
|       none
|_      zlib@openssh.com
```

FIG. 5

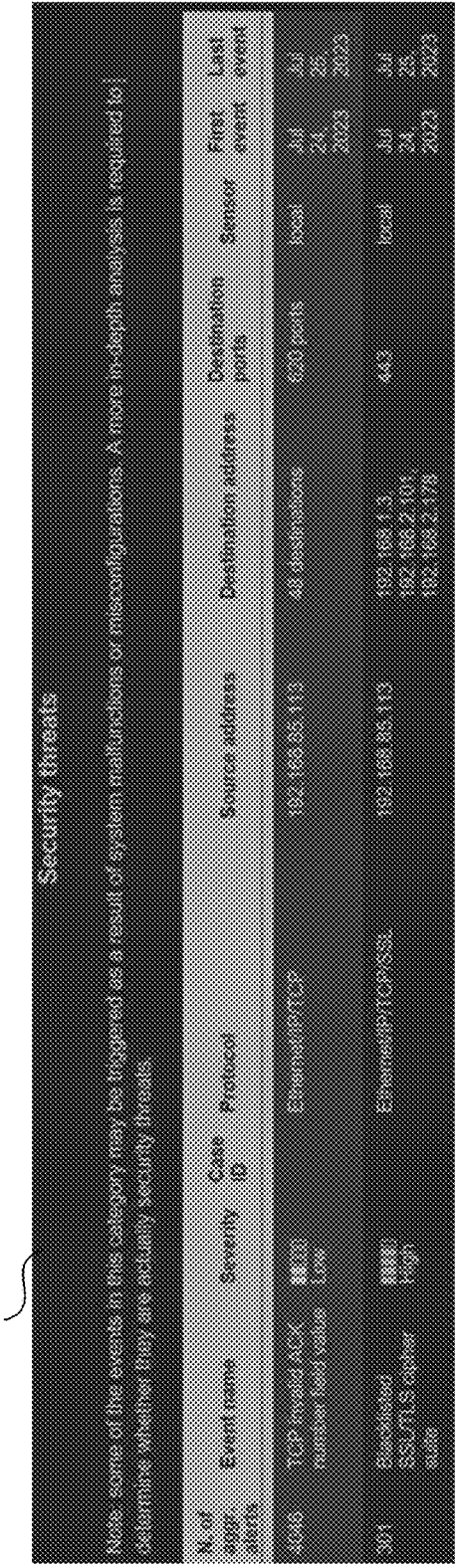
FIG. 7

DETERMINING CRYPTOGRAPHIC QUANTUM-SAFETY FOR NETWORK ASSETS

TECHNICAL FIELD

Aspects and implementations of the present disclosure relate to network monitoring, and more specifically, to determining cryptographic quantum-safety for network assets.

BACKGROUND

Computing devices may communicate with each over a computer network. In a computer network, computing devices can be communicatively coupled to each other over physically wired, optical, or wireless radio-frequency technology. As technology advances, the number and variety of devices that communicate over computer networks increase, as does the amount of data and importance of such data on each computing device. Protection of computing devices and the data against malicious attacks, is a central concern. Computer networks may be analyzed, and security risks may be mitigated.

Quantum computing is a field of computing technology that utilizes principles from quantum mechanics to perform calculations much faster than classical computers. Classical computers use bits as the basic unit of data, which can represent either a 0 or a 1. Quantum computers use quantum bits which are referred to as qubits. These qubits can represent 0, 1, or a superposition of both 0 and 1 states simultaneously using the phenomenon which is referred to as entanglement. With entanglement, qubits become correlated in such a way that the state of one qubit is dependent on the state of another, regardless of the distance between them. This property allows quantum computers to process information and perform calculations much faster than classical computers which are limited to using traditional binary bits. With the increased computational capabilities, quantum computing has the potential to revolutionize various fields, including cryptography.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 5 illustrates examples of sensing output, in accordance with an embodiment.

FIG. 7 illustrates an example of an alert that may be provided in response to analysis of quantum-safe readiness of a device on a network, in accordance with an embodiment.

DETAILED DESCRIPTION

Figure 1:
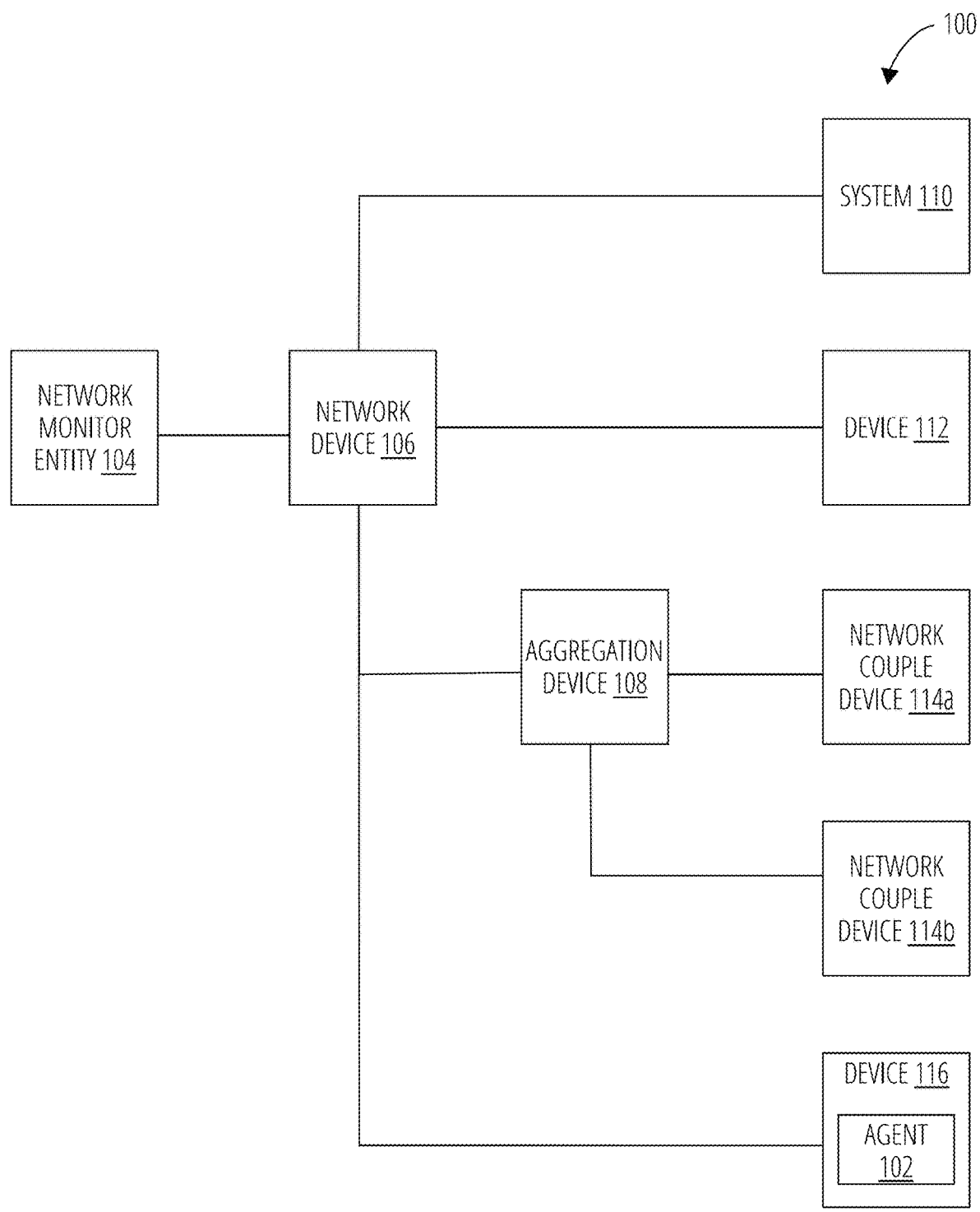
FIG. 1 depicts an example of a communication network, in accordance with an embodiment of the present disclosure.

Aspects and implementations of the present disclosure are directed to analyzing and managing security risks of a network that are associated with quantum computing. Aspects described may determine cryptographic quantum-safety for network assets and respond accordingly.

With the rapid advance of quantum computing and the possibility of a cryptographically-relevant quantum computer (CRQC) breaking traditional asymmetric encryption schemes such as Rivest Shamir Adleman (RSA) in the next few years, there may be a need to migrate to post-quantum cryptographic (PQC) algorithms which may also be referred to as quantum-safe algorithms. A PQC algorithm may be a computer encryption algorithm that has been deemed (e.g., by experts or governing bodies) to be safe or resistant to quantum computers breaking the encryption (e.g., by decrypting or solving a problem of the encryption without an authorized key). Such a risk holds especially true for networks that support critical infrastructure sectors.

Computer encryption is a security technique that protects information by converting it into a code (encryption), making it unreadable without a decryption key. Encryption is used to support the confidentiality, integrity, and authenticity of data, which is useful especially in the context of computer networks and critical or sensitive data and operations. Encryption may be performed using different encryption (e.g., mathematical) algorithms and keys. Plaintext data is the original readable data, such as a message or a file. Ciphertext is the encrypted version of the plaintext. It appears as a random sequence of characters and is unreadable without the decryption key. An encryption algorithm may be a mathematical process that transforms plaintext into ciphertext. It uses specific algorithms such as, for example, AES (Advanced Encryption Standard), RSA (Rivest-Shamir-Adleman), DES (Data Encryption Standard), or other encryption algorithms or variations thereof. Some algorithms (which may also be referred to as a cipher) may be resistant to quantum computing decryption (without a key) while others may not. Those that are understood as resistant may be deemed to be PQC algorithms and quantum-safe. An encryption key is a unique piece of information used to control the encryption and decryption processes. The encryption key may be used to convert plaintext to ciphertext, and the decryption key is used to revert ciphertext to plaintext.

Encryption may be symmetric or asymmetric. In symmetric encryption, the same key is used for both encryption and decryption. Both the sender and the receiver need to possess the same key. In asymmetric encryption, a pair of keys are used. A public key is used for encryption and a private key used for decryption. Messages encrypted with the public key can only be decrypted with the corresponding private key. This approach provides a higher level of security than symmetric encryption and eliminates the need for both parties to share the same key. End to end encryption ensures that only the sender and the intended recipient can read the encrypted messages. For example, even the service provider that facilitates the communication cannot access the decrypted content. Transport Layer Security (TLS) is a network protocol that ensures secure communication over computer networks. It may use a combination of symmetric and asymmetric encryption to secure data transmission over the internet, commonly used for secure browsing (e.g., HTTPS).

A cipher suite is a combination of cryptographic algorithms and protocols used to establish secure communications over a computer network. It defines the set of encryption, authentication, signature, and key exchange algorithms that will be used during a secure connection between two parties, such as a client and a server. Cipher suites are commonly used in protocols like SSH, TLS, and Secure Sockets Layer (SSL), to ensure the confidentiality and integrity of data exchanged over the network.

A typical cipher suite includes several components such as, for example, a key exchange algorithm, an authentication algorithm, a bulk encryption algorithm, a message authentication code algorithm, a compression algorithm, or other algorithm. During the handshake process when communication is to be established over a given protocol, devices may exchange which algorithms of each type are supported. A key exchange algorithm is used to securely exchange encryption keys between the communicating parties. Examples include RSA, Diffie-Hellman (DH), and Elliptic Curve Diffie-Hellman (ECDH). An authentication algorithm verifies the identity of the parties involved in the communication. It ensures that the entities are who they claim to be. This involves methods like public key authentication, password-based authentication, or certificate-based authentication. Common authentication methods include RSA, Digital Signatures, and Elliptic Curve Digital Signature Algorithm (ECDSA). A bulk encryption algorithm may be used for encrypting and decrypting the actual data being transmitted. Examples include Advanced Encryption Standard (AES), Triple DES (3DES), and ChaCha20. A Message Authentication Code (MAC) algorithm ensures the integrity of the transmitted data by generating a checksum that is appended to the data. MAC algorithms may include HMAC-SHA256 and HMAC-SHA512.

National institute of Standards and Technology (NIST) has led a PQC standardization effort since 2016 and in 2022 selected Kyber as the first PQC algorithm for Key Encapsulation Mechanism (KEM) to be standardized. The final standard is expected in 2024, but there are already academic proposed implementations for using Kyber on embedded devices, such as Internet of Things (IoT) and Operational Technology (OT) equipment. There are also commercial cloud providers that support hybrid post-quantum transport layer security (TLS), which is being standardized by the Internet Engineering Task Force (IETF), on their servers. Modern web browsers also may provide experimental support for hybrid Kyber (e.g., as a TLS v1.3 client) which currently makes it possible to browse parts of the web using PQC.

More practically, OpenSSH v9 uses a hybrid key exchange method (Streamlined NTRU Prime+x25519, or "sntrup761x25519-sha512@openssh.com") by default, where "Streamlined NTRU Prime" is a PQC algorithm. Millions of internet connected devices using OpenSSH already support this PQC method.

As standardization and technology advance, there have been initial regulatory pushes for adopting PQC to mitigate risk posed by advances in quantum computing. With support for PQC arriving on computer networks, the problem grows of identifying which assets (and services performed by those assets) are quantum-safe, and which are not. Determining compliance of assets with respect to this risk also grows in importance.

Under existing solutions, there is a deficiency as to assessing the preparedness or quantum-safety of an asset (e.g., a device on the network). Existing solutions lack the capability of determining whether each asset (or services performed by each asset) are using PQC algorithms. As such, existing solutions do not provide an indication of how vulnerable a network or a portion of a network is, relative to the potential cryptographic capabilities of a quantum computer. If an asset is utilizing cipher suites that are not quantum-safe, a quantum computer can potentially break the encryption and make sense of the underlying data.

Accordingly, systems, methods, techniques, and related technologies are described herein in various implementations that includes a network monitor entity that may identify whether a network asset (e.g., a device) supports PQC algorithms and to assign a value (e.g., representing risk or compliance) to that asset based on this information. Aspects described address the problem of identifying on a given network which assets, such as connected devices and cloud workloads, support quantum-safe or post-quantum cryptographic (PQC) algorithms for secure communications, and assign a value to the asset accordingly. Network assets may support PQC algorithms to different extents for different types of services. For example, service may communicate over different protocols such as Secure Shell (SSH) and Transport Layer Security (TLS), which forms the basis of protocols such as HTTPS, and may communicate over dedicated ports. Based on the type of asset, the type of service, and to what extent the asset or service supports PQC, the system can determine the value associated with the asset.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor entity 104, a network device 106, an aggregation device 108, a system 110, devices 112 and 116, and network coupled devices 114a and 114b. The devices 112 and 116 and network coupled devices 114a and 114b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 106 may be one or more network devices configured to facilitate communication among aggregation device 108, system 110, network monitor entity 104, devices 112 and 116, and network coupled devices 114a and 114b. Network device 106 may be one or more network switches, access points, routers, firewalls, hubs, etc.

Network monitor entity 104 may be operable for a variety of tasks including determining data that is held on each of one or more devices on a network, determining a security risk of the device based at least on the data (e.g., whether or not the data is sensitive), and segmenting the network in response to if the security risk satisfies a threshold, such that accessibility to the offending device is reduced. In some embodiments, network monitor entity 104 can use local resources (e.g., processing, memory, data resources, or other resources), cloud resources, or a combination thereof for such an operation. In various embodiments, various libraries or an application programming interface (API) may be used to perform the operations of the network monitor entity 104.

Network monitor entity 104 can determine one or more enforcement points where the device is communicatively coupled to the network and thereby determine the one or more enforcement points closest to the device. For example, network monitor entity 104 may access information on a switch (e.g., a switch cache) to determine a port (e.g., physical port, wireless port, or virtual port) where a device with a particular Internet Protocol (IP) address or Medium Access Control (MAC) address or other identifier is communicatively coupled. Network monitor entity 102 may also access information from a wireless access point where the device is communicatively coupled. In some embodiments, network monitor entity 104 may poll information from a cloud service to determine where a device is communicatively coupled or connected to a network. In various embodiments, network monitor entity 104 may access syslog or Simple Network Management Protocol (SNMP) information from a device itself to determine where a device is communicatively coupled or connected to a network (e.g., without accessing information from a network device or enforcement point). Network monitor entity 104 supports applying access policies in situations where a device is communicatively coupled to a network with more than one connection (e.g., a wired connection and a wireless connection).

Based on the enforcement point, network monitor entity 104 may determine the one or more access rules to be assigned to the one or more enforcement points based on an access policy. In some embodiments, based on information about the one or more enforcement points closest to the device, network monitor entity 104 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communicatively coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 104 may access the current configuration of the one or more enforcement points to determine the access rules (e.g., Access Control Lists—ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 104 may then apply or assign the access rules to the one or more enforcement points closest to the device. Network monitor entity 104 may communicate the access rules via application programming interfaces (APIs), command line interface (CLI) commands, Web interface, simple network management protocol (SNMP) interface, etc. In some embodiments, network monitor entity 104 may verify that the one or more enforcement points have been properly or correctly configured based on the access rules.

Network monitor entity 104 may provide an interface (e.g., a graphical user interface (GUI)) for viewing, monitoring, and modifying classification or associated thresholds associated with one or more models. Network monitor entity 104 may further monitor network traffic over time to reclassify entities as new entities join the network, entities rejoin the network, and new models are made available.

Network monitor entity 104 may further perform a variety of operations including identification, classification, and taking one or more remediation actions (e.g., changing network access of a device, changing the virtual local area network (VLAN), sending an email, sending a short message service (SMS) message, etc.).

Network monitor entity 104 may also parse network traffic. For example, the network monitor entity 102 may parse (e.g., read, analyze, access, etc.) different protocol fields of the network traffic (e.g., packets, messages, frames, etc.). The network monitor entity 104 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 104 may include a parser and one or more processing engines, as described herein.

An enforcement point may be a router, firewall, switch, hypervisor, software-defined networking (SDN) controller, virtual firewall, or other network device or infrastructure that may have an ACL-like or rule-like policy or functionality to apply based on the port where a device is communicatively coupled thereto. Enforcements points may also be a next generation firewall (NGFW) and cloud infrastructure. A NGFW can be updated with an ACL-like policy regarding a device accessing the Internet. Cloud infrastructure (e.g., Amazon web services (AWS) security groups) can be updated to drop packets from the IP address of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 104 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 104 may be communicatively coupled to the network device 106 in such a way as to receive network traffic flowing through the network device 106 (e.g., port mirroring, sniffing, acting as a proxy, passive monitoring, etc.). In some embodiments, network monitor entity 104 may include one or more of the aforementioned devices. In various embodiments, network monitor entity 104 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 110), communication (e.g., querying) with an aggregation device (e.g., aggregation device 106), and querying the device itself (e.g., via an application programming interface (API), command line interface (CLI), web interface, simple network management protocol (SNMP), etc.). Network monitor entity 104 may be operable to use one or more APIs to communicate with aggregation device 108, device 112, device 116, or system 110. Network monitor entity 104 may monitor for or scan for entities that are communicatively coupled to a network via a Network Address Translation (NAT) device (e.g., firewall, router, etc.) dynamically, periodically, or a combination thereof.

Information from one or more external or third party systems (e.g., system 110) may further be used for determining one or more tags or characteristics for a device. For example, a vulnerability assessment (VA) system may be queried to verify or check if a device is in compliance and provide that information to network monitor entity 104. External or third party systems may also be used to perform a scan or a check on a device to determine a software version.

Device 116 can include agent 102. The agent 102 may be a hardware component, software component, or some combination thereof configured to gather information associated with device 116 and send that information to network monitor entity 104. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 102 may be configured to provide different levels and pieces of information based on device 116 and the information available to agent 102 from device 116. Agent 102 may be able to store logs of information associated with device 116. Network monitor entity 104 may utilize agent information from the agent 102. While network monitor entity 104 may be able to receive information from agent 102, installation or execution of agent 102 on many entities may not be possible, e.g., IoT or smart devices.

System 110 may be one or more external, remote, or third party systems (e.g., separate) from network monitor entity 104 and may have information about devices 112 and 116 and network coupled devices 114a and 114b. System 110 may include a vulnerability assessment (VA) system, a threat detection (TD) system, endpoint management system, a mobile device management (MDM) system, a firewall (FW) system, a switch system, an access point system, etc. Network monitor entity 104 may be configured to communicate with system 110 to obtain information about devices 112 and 116 and network coupled device 114a and network couple device 114b on a periodic basis, as described herein. For example, system 110 may be a vulnerability assessment system configured to determine if device 112 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 104.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 106 or aggregation device 108) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 104 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 108 may be configured to communicate with network coupled devices 114a and 114b and provide network access to network coupled devices 114a and 114b. Aggregation device 108 may further be configured to provide information (e.g., operating system, device software information, device software versions, device names, application present, running, or both, vulnerabilities, patch level, etc.) to network monitor entity 104 about the network coupled devices 114a and 114b. Aggregation device 108 may be a wireless access point that is configured to communicate with a wide variety of devices through multiple technology standards or protocols including, but not limited to, Bluetooth™, Wi-Fi™, ZigBee™, Radio-frequency identification (RFI D), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 108 may be coupled to the network device 106 via an Ethernet connection and coupled to network coupled devices 114a and 114b via a wireless connection. Aggregation device 108 may be configured to communicate with network coupled devices 114a and 114b using a standard protocol with proprietary extensions or modifications.

Aggregation device 108 may further provide log information of activity and properties of network coupled devices 114a and 114b to network monitor entity 104. It is appreciated that log information may be particularly reliable for stable network environments (e.g., where the types of devices on the network do not change often). The log information may include information of updates of software of network coupled devices 114a and 114b.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, or other network components or devices may be used to enforce segmentation on a network (and different address subnets may be used for each segment). Enforcement points may enforce segmentation by filtering or dropping packets according to the network segmentation policies/rules.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network. A segmentation policy or suggestion may include access rules that are determined to reduce a security risk of one or more devices on the network.

In an aspect, the VA system may assess risk of assets on the network, based on their PQC readiness. The PQC readiness may be represented by a value that indicates how resistant, as a whole, the asset is with respect to an attack by a quantum computer.

Figure 2:
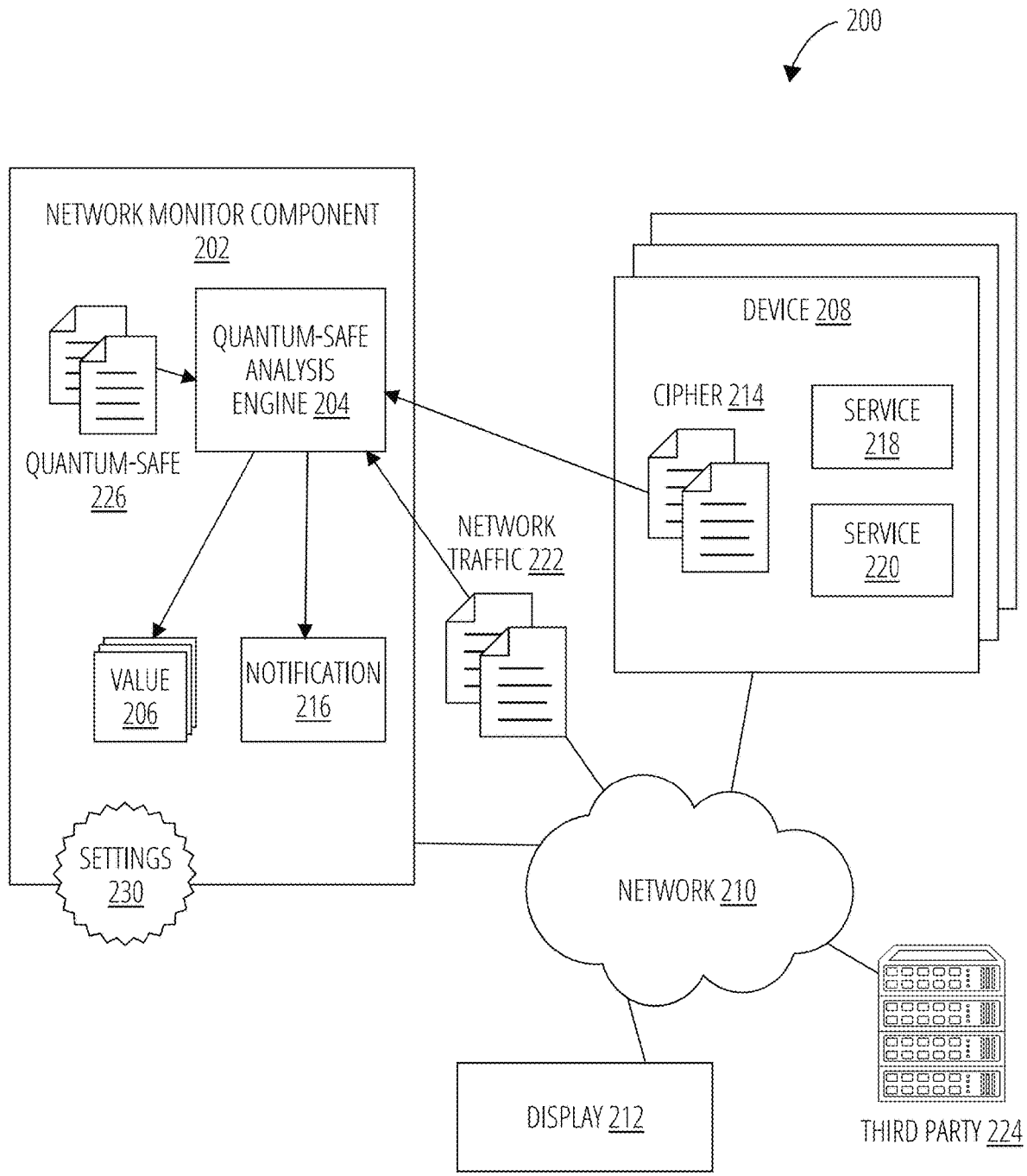
FIG. 2 depicts an example of a computer network, in accordance with an embodiment.

FIG. 2 depicts an illustrative computer network with a network monitor component 202 in accordance with one implementation of the present disclosure. System 200 may include network 210 and computing devices communicatively coupled to network 210 (e.g., through internet protocol).

Network 210 may represent a single computer network, or it may represent numerous computer networks which may be interconnected or isolated from each other. The network 210 may include device 208 that is coupled to the network. Device 208 may represent a plurality of different computing devices coupled to network 210. Device 208 may include computer servers, IoT devices (e.g., a television, sensors, appliances, medical equipment, exercise equipment, or other IoT device), personal computers, databases, mobile phones, tablet computers, proprietary operational technology (OT), one or more entities, and more. Each of the one or more devices 208 may represent a connected device, a virtual machine, or a cloud workload. Network 210 may include one or more network devices such as network device 106, network couple device 114a, 114b, aggregation device 108, and any of the network components described with respect to FIG. 1.

Network monitor component 202 may be communicatively coupled to the network 210. Network monitor component 202 may correspond with network monitor entity 104 as described with respect to FIG. 1. Network monitor component 202 may include a quantum-safe analysis engine 204. Quantum-safe analysis engine 204 may obtain one or more ciphers 214 that are supported by device 208. Quantum-safe analysis engine 204 may determine a value 206 associated with the device 208, based on whether each of the one or more ciphers 214 that are supported by the device is quantum-safe. Quantum-safe analysis engine 204 may generate a notification 216 based on the value.

In an example, quantum-safe analysis engine 204 may present the notification 216 to display 212. The notification 216 may include each of the one or more devices 208 and the value that is associated with each device, to provide a user with an understanding of the risks on network 210 with respect to quantum computing for each asset. Display 212 may be integral to network monitor component 202, or integral to a different network connected device. The notification may be provided as an alert, a report, an email, etc.

In an example, obtaining the one or more ciphers may include initiating a handshake process to communicate with the device 208 over the network 210. For example, quantum-safe analysis engine 204 may initiate a SSH connection or a TLS connection between itself and device 208 to trigger a handshake procedure between network monitor component 202 and device 208. During the handshake procedure, device 208 provides network monitor component with ciphers 214 (e.g., a cipher suite that describes all supported ciphers for a given service). This may be referred to as an active technique, given that the quantum-safe analysis engine 204 will initiate communication with the device 208 to obtain its one or more ciphers 214.

Additionally, or alternatively, obtaining the one or more ciphers 214 may include parsing network traffic 214 to detect encrypted connection attempts in the network traffic, and parsing the connection attempts to obtain the one or more ciphers that are supported by the device. Network monitor components 202 may obtain the network traffic 214 from one or more devices (e.g., a network device 106). This may be referred to as a passive technique, given that the quantum-safe analysis engine 204 can refrain from disturbing device 208 while still obtaining the one or more ciphers 214 supported by device 208.

Additionally, or alternatively, obtaining the one or more ciphers 214 may include obtaining the one or more ciphers from a third party server 224. The third party may obtain the one or more ciphers 214 from device 208 through active or passive techniques, as described above. Quantum-safe analysis engine 204 may use one or more application programming interface (API) calls, or a network protocol, to obtain the one or more ciphers 214 from third party 224.

In an example, determining the value 206 associated with the device 208 may include comparing the one or more ciphers 214 that are supported by the device 208 with a list of quantum-safe algorithms to determine if each of the one or more ciphers is listed in the list of quantum-safe algorithms. The value may be a scaled number, a binary (e.g., 0, 1), and enumerated set (e.g., weak, moderate, strong), text, or other value that indicates to what extend the ciphers supported by an asset are quantum-safe. The quantum-safe analysis engine 204 may determine the value using different rubrics. For example, under a strict rubric, if one or more of the supported ciphers for a given service or device are not quantum-safe, then the value may be a 'fail'. Under a less strict rubric, if a threshold (e.g., a number of ciphers or a percentage of ciphers) are quantum-safe, or if a particular quantum-safe algorithm is supported, then the value may indicate a 'pass'.

In an example, each of the one or more ciphers 214 is associated with a service (e.g., 218, 220) that is supported by the device on the network. For example, service 218 support a first set of ciphers (e.g., a first cipher suite) and service 220 may support a second set of ciphers (e.g., a second cipher suite). Network monitor component 202 may actively or passively obtain the respective ciphers on a per-service basis (e.g., by initiating a connection to a service, or by parsing network traffic by that service). Each service may communicate over a respective port on device 208. The notification 216 may be generated based on whether each of the one or more ciphers that are associated with the service are quantum-safe.

In an example, determining the value is further based on a setting that determines a risk tolerance for the network or a portion of the network with respect to quantum-safety. For example, depending on a risk tolerance setting (e.g., in settings 230), the notification 216 may indicate whether a device or service of a device is not deemed to be quantum-safe when even one of the ciphers 214 are not quantum-safe, or when a number or percentage of the ciphers 214 are not quantum-safe. The threshold for this indication may be tuned in setting 230, which may be exposed to a user so that a user (e.g., a network administrator) may control a sensitivity of notification 216 with respect to quantum-safe ciphers. The settings may include different thresholds per device type, per network segment, or a combination thereof.

In an example, determining the value 206 is further based on at least one of: a type of the device 208, a criticality of data stored on the device 208, or a criticality of operations performed by the device 208. For example, if the device 208 serves as a programmable logic controller (PLC) or does not handle critical data or does not perform operations deemed to be critical, network monitor component 202 may adjust the value 206 to reduce the risk (or increase compatibility). Similarly, if the device 208 serves as a data server, or does handle critical data or does perform operations deemed to be critical, network monitor component 202 may adjust the value 206 to increase the risk (or decrease compatibility) indicated by the value.

In an example, quantum-safe analysis engine 204 may perform one or more actions to reduce a security risk of the network, in response to the value 206 satisfying a threshold. The threshold may be adjustable through settings 230. For example, the action may include segmenting the network to isolate the device 208, or the action may include filtering communication to or from the device 208, in response to the value 206 satisfying the threshold (e.g., indicating an elevated risk to quantum computing attacks). Additionally, or alternatively, the notification 216 may be an action triggered by the value 206 satisfying the threshold. For example, quantum-safe analysis engine 204 may present notification 216 to a display 212 (e.g., as an alert, or email, or report) indicating the value 206 associated with device 208. The one or more actions may be performed automatically (e.g., without human input, human interaction, or human confirmation), such as at the time the value is determined. Other operations described may also be performed by quantum-safe analysis engine 204 automatically.

Quantum-safe analysis engine 204 may determine the value 206 for each device on network 210, or for each of a device of a given type (e.g., those handling sensitive or critical data), or for each device in a specified portion of the network 210.

The features described with respect to FIG. 2 may correspond to features described in other sections. For example, some of the features are further elaborated on in other sections and described with respect to other figures.

Figure 3:
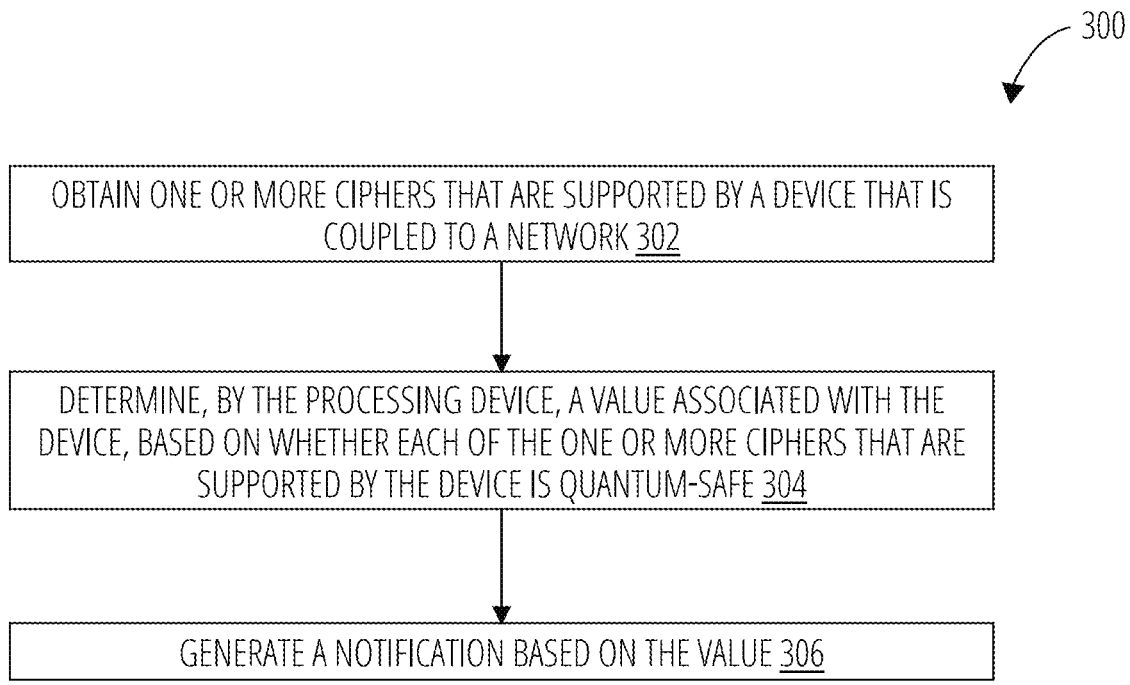
FIG. 3 illustrates an example method for determining cryptographic quantum-safety for network assets, in accordance with an embodiment.

FIG. 3 illustrates an example method 300 for determining cryptographic quantum-safety for network assets, in accordance with an embodiment. Although the example method 300 depicts a particular sequence of operations, the sequence may be altered without departing from the scope of the present disclosure. Method 300 may be performed by processing logic which may be integral to one or more processing devices. Processing logic may comprise hardware (e.g., circuitry, dedicated logic, programmable logic, a processor, a processing device, a central processing unit (CPU), a system-on-chip (SoC), a transmitter, a receiver, etc.), software (e.g., instructions stored in memory executed by a processing device), firmware (e.g., microcode), or a combination thereof.

At block 302, processing logic obtains one or more ciphers that are supported by a device that is coupled to a network. As described, the one or more ciphers may be obtained on a per-service basis. Each service may utilize a respective cipher suite (e.g., a group of ciphers) that the service supports for encrypting or protecting communications to and from the device. Processing logic may employ active techniques, passive techniques, or a both, to obtain the cipher suite of each service of a device. Processing logic may also obtain the one or more ciphers from a third party server.

At block 304, processing logic determines a value associated with the device, based on whether each of the one or more ciphers that are supported by the device is quantum-safe. For example, processing logic may compare each of the one or more ciphers to a list of algorithms deemed to be quantum safe (e.g., PQC algorithms). This list may be obtained on a separate server, a database, a repository, a service, etc. The list may be updated periodically (e.g., by a regulatory body or by a standards-enforcing group).

At block 306, processing logic generates a notification based on the value. The notification may provide different levels of granularity such as which devices are not deemed to be quantum safe, which services on devices are not deemed to be quantum-safe, and/or which of the algorithms supported by a given service are not deemed to be quantum-safe. The notification may be presented to a display, for example, using graphical user interface (GUI) elements to indicate the devices, the values, the risk associated with each device or service, etc.

Processing logic may repeat the operations described with respect to method 300 for multiple devices on the network, and present the notification to include the values for multiple devices together. As described, processing logic may, in addition, perform remedial network operations that reduce the security risk posed by quantum-computing in response to determining that the value exceeds a threshold.

The method 300 may be performed by a system, comprising: a memory; and a processing device, operatively coupled to the memory, configured to perform the described operations. Similarly, a non-transitory computer readable medium may have instructions encoded thereon that, when executed by a processing device, cause the processing device to perform the operations described.

Figure 4:
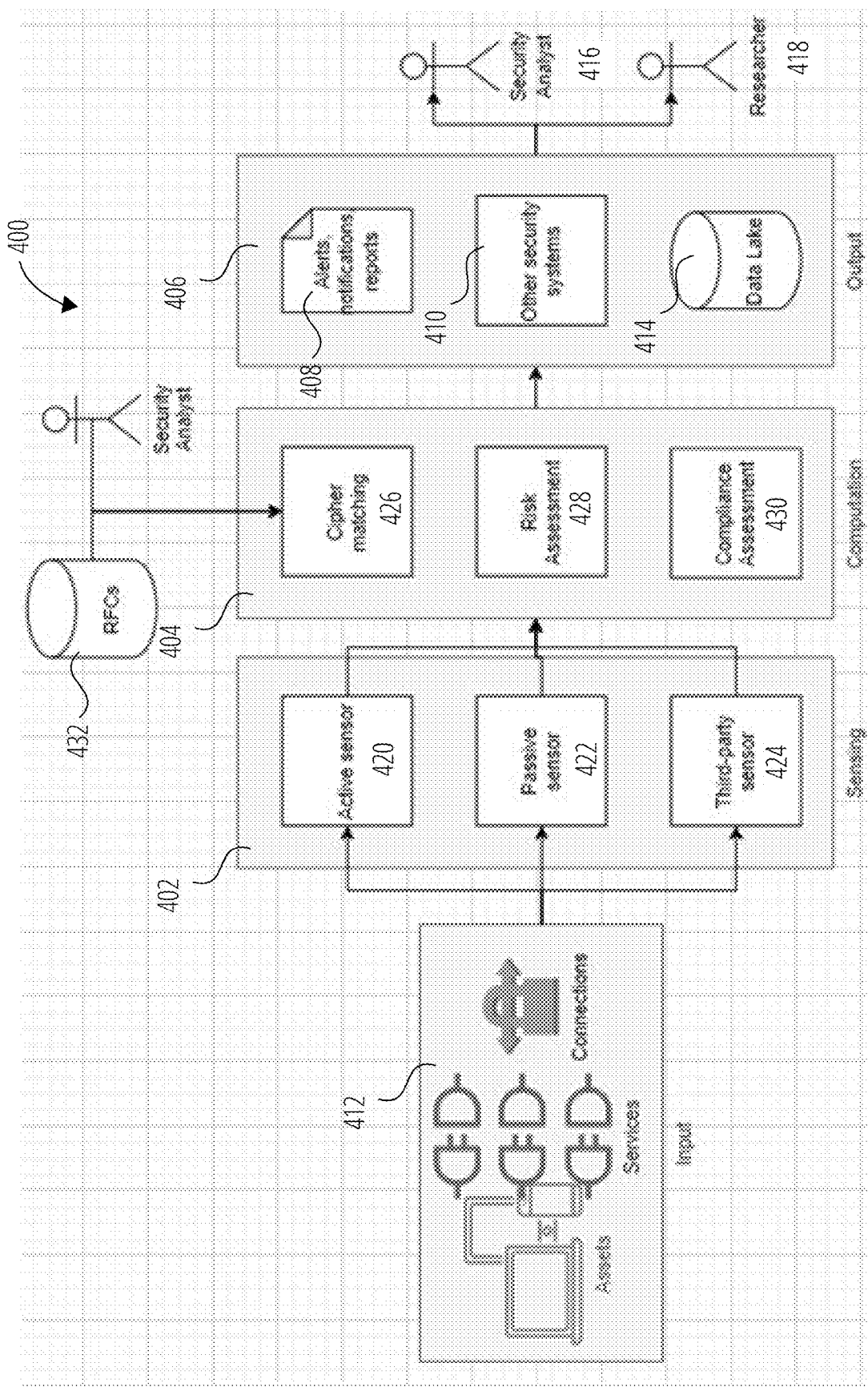
FIG. 4 illustrates an example process for determining network assets that are quantum-safe and their associated risk, in accordance with an embodiment.

FIG. 4 shows an example process for determining network assets that are quantum-safe and their associated risk, according to an embodiment. The process 400 may be performed by quantum-safe analysis engine 204.

The input 412 may consist of network assets such as connected devices, virtual machines, and cloud workloads. These network assets offer network services such as SSH, HTTPS, SFTP and accept or start encrypted connections with other assets for these services. These connections are setup between a client and a server using specific encryption algorithms which may be referred to as cipher suites in TLS jargon, that comprise, for instance, key exchange (KEX) algorithms, bulk encryption algorithms and message authentication code (MAC) algorithms. Services typically rely on TLS with cipher suites as the underlying encryption protocol, but some services, such as SSH may implement their own cryptographic layer, using a similar concept as cipher suites that include KEX algorithms, server host key algorithms, encryption algorithms, MAC algorithms, and compression algorithms.

When a client and a server set up a connection, there is a handshake process where they negotiate the encryption by exchanging the information about the accepted algorithms and agreeing on which algorithm to use (typically the strongest accepted by both parties).

Examples of handshake processes in a secure socket shell (SSH) protocol and TLS environment may be found at https://www.ss12buy.com/wiki/ssh-vs-ssl-tls or in other documentation. During a handshake, the client and server exchange supported algorithms (ciphers) so that they can agree upon which algorithm to user to encrypt (and decrypt) the communications.

A list of currently standardized cipher suites for TLS is maintained by Internet Assigned Numbers Authority (IANA) so that different implementations agree on how to call and encode each cipher suite during the handshake process. For instance, "TLS_AES_128_GCM_SHA256" is encoded in binary as 0x1301 and represents the use of the Advanced Encryption Standard (AES) with a key length of 128 bits in Galois/Counter Mode (GCM) of operation as the cipher and SHA256 as the hash algorithm. With the binary code of an algorithm, aspects described may sense and parse handshake communications to determine which ciphers are supported by a service and device.

New PQC cryptographic algorithms and cipher suites are not yet standardized for SSH or TLS, so the naming and encoding conventions are implementation-specific. There are some agreed upon values in draft RFCs and implementations, but those are not centrally managed. For instance, "TLS_ECDHE-KYBER-RSA-AES256-GCM-SHA384" is encoded as 0xFF0C in a draft RFC and on AWS's TLS implementation. Similarly, "ecdh-nistp256-kyber-512r3-sha256-d00@openquantumsafe.org" is defined for SSH in another draft RFC. Other examples can be found on several RFC drafts and implementations.

In FIG. 4, at block 402, the process performs sensing by using different methods to obtain the information of which encryption algorithms are supported by a network asset. There are mainly three ways to obtain this information, active, passive or via third parties, as described.

An active sensor directly tries to establish connections with an asset to obtain its list of supported ciphers. Examples include nmap's ssl-enum-ciphers and ssh2-enum-algos scripts. Passive sensors simply monitor the network traffic, identify encrypted connection attempts and parse the handshake to understand the offered list of ciphers. An example of passive sensor is the Snort IDS. Third-party sensors just process information obtained by third-party applications, such as vulnerability assessment tools, which in the end employ either passive or active techniques themselves. The process or quantum-safe analysis engine 204 may utilize existing tools to perform sensing 402.

At computation block 404 of FIG. 4, the process takes the sensed ciphers and performs cipher matching (at block 426) to reference the sensed ciphers against a list of known quantum-safe algorithms. The process may, at block 428, perform risk assessment and compliance assessment 430 based on various other factors. Risk assessment may consider the sensitivity of data handled by a device, or the operations performed by the device, a type of the device (e.g., data server, OT, PLC, etc.). Compliance assessment may consider the sensed ciphers in view of known quantum-safe algorithms and other rubrics which may be set forth based on one or more governing bodies and/or a network requirements. Based on the comparison of the sensed ciphers (obtained at 402) with quantum-safe ciphers (at cipher matching 426), which may consider risk assessment 428 and compliance assessment 430, the process may determine and assign a value (e.g., a risk value or compliance value) to the asset.

At output block 406, the process may generate, based on the values of the respective assets, one or more alerts, notifications, or reports 408, notify other security systems at block 410, or store the values in a data lake 414. Security analyst 416 and researcher 418 may assess the values for each device from data lake 414.

FIG. 5 shows examples of sensing output, in accordance with an embodiment. Example 504 shows information that is sensed for TLS cipher suites on port 443/TCP using an active sensing technique. Example 506 shows SSH algorithms that are sensed on port 22/TCP of an asset. In both examples, none of the displayed algorithms is quantum-safe.

A network protocol analyzer tool (e.g., Wireshark) can display information captured through passive sensing on the network. The information can include TLS cipher suites and SSH algorithms of different assets. Several quantum-safe ciphers may be included in the display information although not immediately recognized by the tool because of the lack of standardization. An example traffic capture of a QUIC network protocol over TLS v1.3 connection with several cipher suites including PQC algorithms is shown at https://aws.amazon.com/blogs/security/enable-post-quantum-key-exchange-in-quic-with-the-s2n-quic-library/and is discussed here for context. The "ecdh0nistp384-kyber-768r3-sha384-d00" cipher is readily identifiable on SSH, but some of the binary-encoded ciphers on the TLS capture are also quantum-safe, such as "X25519+Kyber512" with identifier 0x2f39. In another example, an SSH key exchange using the ecdh0nistp384-kyber-768r3-sha384-d00 hybrid cipher may be found at https://aws.amazon.com/blogs/security/post-quantum-hybrid-sftp-file-transfers-using-aws-transfer-family/.

After all the information (e.g., the supported cipher for a given service or device) is gathered in the sensing part (block 402 of FIG. 4), it is sent to the computation block 404. There, cipher matching 426 is performed (e.g., as the first step). Matching may include comparing the sensed information with algorithms that are known to be quantum-safe or not. The information of whether a cipher is quantum-safe can be either provided beforehand based on existing RFC documents and implementations 432 or provided by the user.

Figure 6:
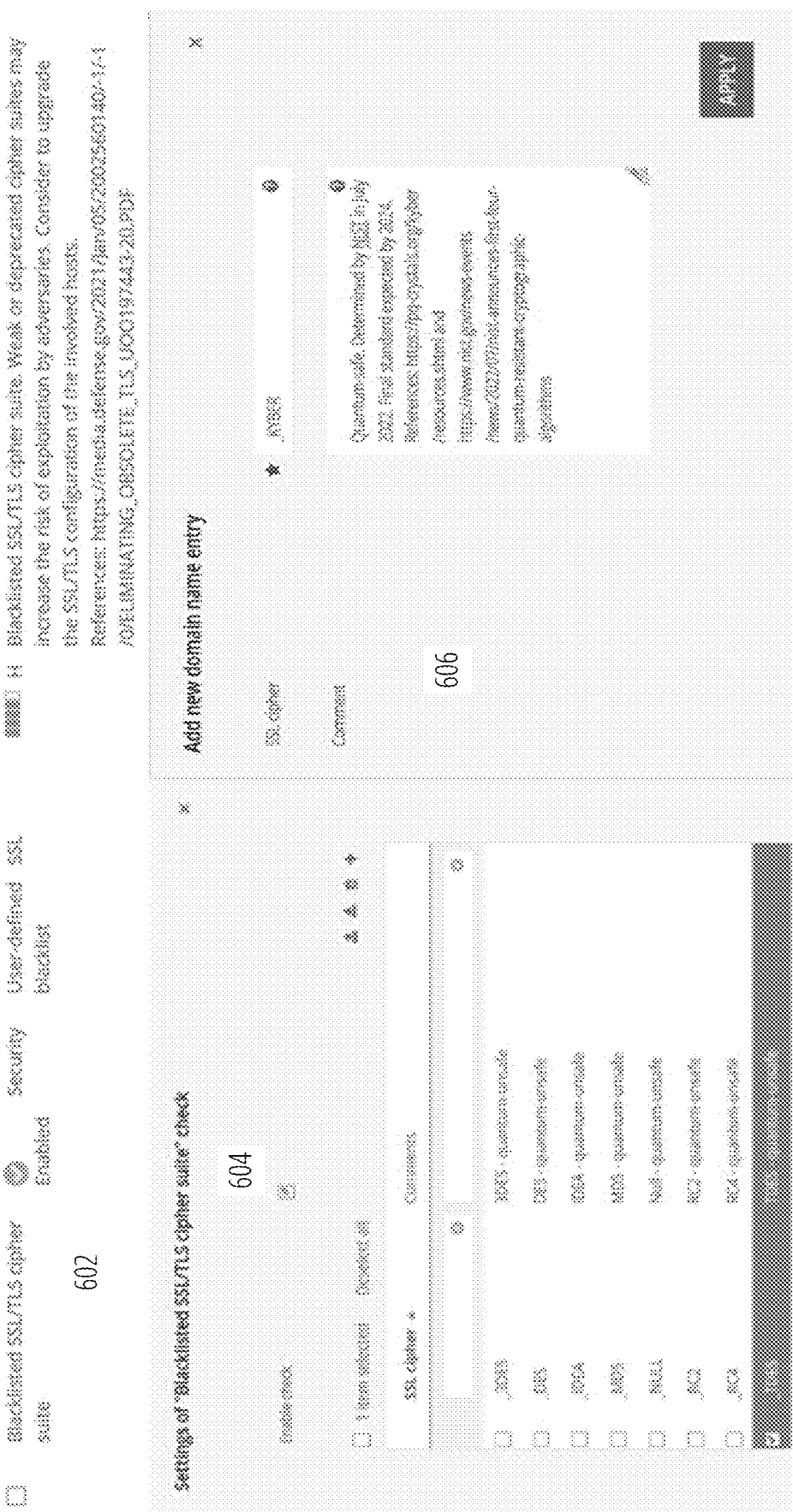
FIG. 6 illustrates an example of obtaining quantum-safe algorithms for reference, in accordance with an embodiment.

FIG. 6 illustrates an example of obtaining quantum-safe algorithms for reference, in accordance with an embodiment. RFC documents and implementations can be automatically parsed and included in a product (e.g., as shown in FIG. 6, window 604) or provided by a user (as shown in FIG. 6, window 606). In both cases, more contextual information can be added. For instance, the user may include KYBER as a quantum-safe cipher in FIG. 6 including the information that it was determined quantum-safe by NIST in 2022 and the final standard is expected by 2024.

The matching can be performed on a per cipher and per service basis for an asset. For example, if device 208 has two services, 218 and 220, the process may obtain a list of ciphers supported by service 218, and a second list of ciphers supported by service 220. The process may determine whether each of the ciphers in the first list are included in the known list of quantum-safe algorithms, and generate a profile for each service that includes whether each of the services supported by that service is quantum-safe. The process may repeat this process for the second list of ciphers. By definition, if all presented ciphers for a service are quantum-safe, the service may be deemed to be quantum-safe and if all ciphers are quantum-unsafe, then the service may be deemed to be quantum-unsafe. In an embodiment, when there is a mix of quantum-safe and unsafe ciphers, the decision of whether to consider the service safe (loose condition) or unsafe (strict condition) can be tuned by the user depending on a chosen use case. The typical behavior is that the detection of a quantum-unsafe cipher will trigger an alert. The strict condition may be a default (as shown at the top of window 602 of FIG. 6) which may be stored and modified as a setting. Similarly, to consider a device safe or unsafe, a decision based on an aggregation of all the services in that asset (and the respective profile for each service) can be performed. This can also be performed with a loose or strict condition defined by a setting or user.

After the decision regarding quantum-safety of services and assets, during risk assessment (at block 428) a risk value may be associated to each device based on its quantum-safety and other factors, such as the type of device. For instance, quantum-safety may be more relevant for a server in a data center than for a programmable logic controller, since confidentiality is typically less relevant for some types of operational technology. The risk value (e.g., value 206) may be adjusted towards riskier for a data server, and towards less risky for a non-data server (e.g., an OT device or PLC).

Finally, during compliance assessment (at block 430) the previous information of cipher matching (block 426) and risk assessment (block 428) can be compared to existing compliance requirements, such as "every device shall support quantum-safe encryption" or "no device shall support any quantum-unsafe cipher."

After the computation is done, the output can happen in several ways. For instance, FIG. 4 lists alerts, notifications and reports that can be generated and shown to a security analyst directly on a GUI.

FIG. 7, GUI element 702 shows an example of an alert that may be raised for a device that does not support quantum safe cipher suites, according to an embodiment. GUI element 704, shows similar information but in a report format, where the alerts are aggregated and the list of assets matching that alert (i.e., quantum-unsafe assets) is displayed. Regardless of format, this output (e.g., one or more values assigned to respective devices) can be sent in a machine-readable format to other security systems 410, such as, for example security information and event management (SIEM) or extended detection and response (XDR), for either further analysis or response.

In addition, the data can be sent to a data lake 414 for further analysis and research purposes, such as the generation of reports about the adoption of PQC on real-world networks. For example, a security analyst 416 and/or researcher 418 may determine the effectiveness of certain algorithms in a quantum computing environment, which may further promote innovation in the field of encryption.

In an aspect, computation block 404 may obtain, store, and manage the list of quantum-safe algorithms, for example, in a database. As mentioned, computation block 404 may gather the list of quantum-safe algorithms based on one or more of: user input, RFCs, third party sources, web-crawling, and/or other activities. This process may be performed automatically on a periodic basis (e.g., every week) or on an event-driven basis (e.g., in response to a release of a standard, a software release, and/or a user interaction). The list may be stored in a database and updated. Additionally, or alternatively, the process may gather, store, and manage a list of quantum-unsafe algorithms (e.g., encryption algorithms that are known to be vulnerable to being solved by a quantum computer). For each of the stored and referenceable algorithms, the process may store an associated encoded identifier which is the same as that which is shared during the handshake process, so that the process can compare what is sensed from block 402 to the known list of quantum-safe (or quantum-unsafe) algorithms. At block 426, the process may match the sensed supported algorithms with the list of quantum-safe (and/or quantum-unsafe) algorithms to determine the value.

Aspects described support an automated and precise assessment of network assets with respect to quantum-safety, associated risks, and compliance. The described system may reduce the security analyst effort in manually assessing and managing risks related to PQC migration, while aiding in the understanding of compliance status with respect to PQC requirements.

Figure 8:
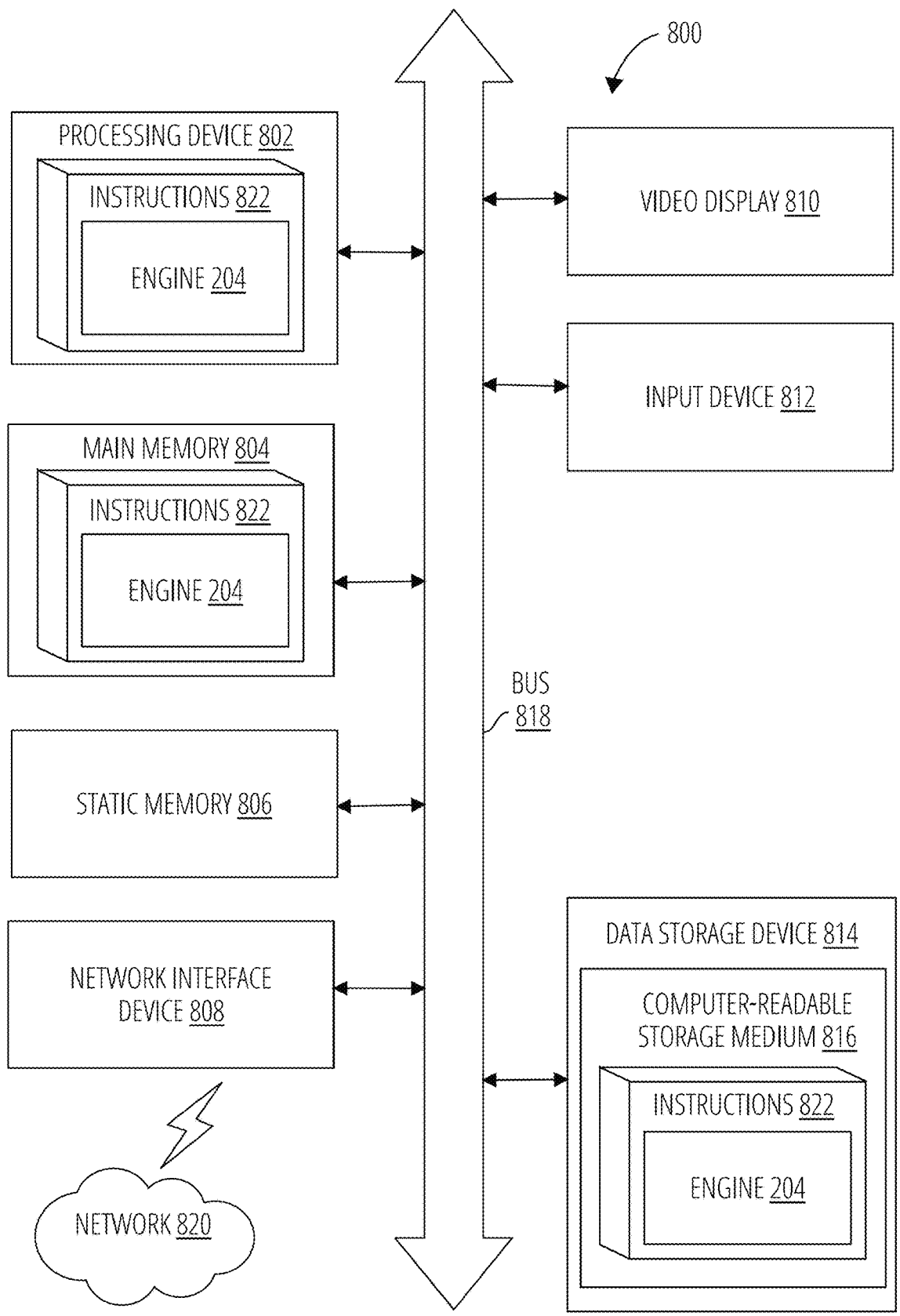
FIG. 8 illustrates an example computer system, in accordance with an embodiment.

FIG. 8 is a block diagram illustrating an example computer system 800, in accordance with one implementation of the present disclosure. This can be understood as a diagrammatic representation of a machine in the example form of a computer system within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. In some embodiments, computer system 800 may be representative of a server, such as network monitor entity 104, 202 running a quantum-safe analysis engine 204 as described herein.

The exemplary computer system 800 includes a processing device 802, a main memory 804 (e.g., read-only memory (ROM), flash memory, dynamic random access memory (DRAM), a static memory 806 (e.g., flash memory, static random access memory (SRAM), etc.), and a data storage device 814, which communicate with each other via a bus 818. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to quantum-safe analysis engine 204, as discussed herein.

The data storage device 814 may include a machine-readable computer-readable storage medium 816, on which is stored one or more set of instructions 822 (e.g., software) embodying any one or more of the methodologies of operations described herein, including instructions to cause the processing device 802 to execute operations of the quantum-safe analysis engine 204. The instructions 822 may also reside, completely or at least partially, within the main memory 804 or within the processing device 802 during execution thereof by the computer system 800; the main memory 804; and the processing device 802 also constituting machine-readable storage media. The instructions 822 may further be transmitted or received over a network 820 via the network interface device 808.

The computer system 800 also may include a video display unit 810 (e.g., a liquid crystal display (LCD) or a cathode ray tube (CRT)) and an input device 812 (e.g., a keyboard or mouse). In one embodiment, video display unit 810 and input device 812 may be combined into a single component or device (e.g., an LCD touch screen).

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, performed by a processing device, comprising:
    obtaining one or more ciphers that are supported by a device that is coupled to a network;
    determining, by the processing device, a value associated with the device, based on whether each of the one or more ciphers that are supported by the device is quantum-safe, wherein determining the value associated with the device comprises comparing the one or more ciphers that are supported by the device with a list of quantum-safe algorithms to determine if each of the one or more ciphers is listed in the list of quantum-safe algorithms; and
    generating a notification based on the value.

2. The method of claim 1, wherein obtaining the one or more ciphers includes initiating a handshake process to communicate with the device over the network.

3. The method of claim 1, wherein obtaining the one or more ciphers includes: parsing network traffic to detect encrypted connection attempts in the network traffic, and parsing the connection attempts to obtain the one or more ciphers that are supported by the device.

4. The method of claim 1, wherein obtaining the one or more ciphers includes obtaining the one or more ciphers from a third party server.

5. The method of claim 1, wherein each of the one or more ciphers is associated with a service that is supported by the device on the network, and the notification is generated based on whether each of the one or more ciphers that are associated with the service are quantum-safe.

6. The method of claim 1, wherein determining the value is further based on at least one of: a type of the device, a criticality of data stored on the device, or a criticality of operations performed by the device.

7. The method of claim 1, wherein determining the value is further based on a setting that determines a risk tolerance for the network or a portion of the network with respect to quantum-safety.

8. The method of claim 1, further comprising performing an action to reduce a security risk of the network, in response to the value satisfying a threshold, the action comprising at least one of: segmenting the network to isolate the device, or filtering communication to or from the device.

9. The method of claim 1, further comprising determining the value for a plurality of devices that are coupled to the network.

10. A system, comprising:
    a memory; and
    a processing device, operatively coupled to the memory, to:
    obtain one or more ciphers that are supported by a device that is coupled to a network;
    determine, by the processing device, a value associated with the device, based on whether each of the one or more ciphers that are supported by the device is quantum-safe, wherein to determine the value associated with the device comprises to compare the one or more ciphers that are supported by the device with a list of quantum-safe algorithms to determine if each of the one or more ciphers is listed in the list of quantum-safe algorithms; and
    generate a notification based on the value.

11. The system of claim 10, wherein to obtain the one or more ciphers includes to initiate a handshake process to communicate with the device over the network.

12. The system of claim 10, wherein to obtain the one or more ciphers includes: to parse network traffic to detect encrypted connection attempts in the network traffic, and parsing the connection attempts to obtain the one or more ciphers that are supported by the device.

13. The system of claim 10, wherein to obtain the one or more ciphers includes to obtain the one or more ciphers from a third party server.

14. A non-transitory computer readable medium having instructions encoded thereon that, when executed by a processing device, cause the processing device to:
    obtain one or more ciphers that are supported by a device that is coupled to a network;
    determine, by the processing device, a value associated with the device, based on whether each of the one or more ciphers that are supported by the device is quantum-safe, wherein to determine the value associated with the device comprises to compare the one or more ciphers that are supported by the device with a list of quantum-safe algorithms to determine if each of the one or more ciphers is listed in the list of quantum-safe algorithms; and
    generate a notification based on the value.

15. The non-transitory computer readable medium of claim 14, wherein to obtain the one or more ciphers includes initiate to initiate a handshake process to communicate with the device over the network.

16. The non-transitory computer readable medium of claim 14, wherein to obtain the one or more ciphers includes: to parse network traffic to detect encrypted connection attempts in the network traffic, and to parse the connection attempts to obtain the one or more ciphers that are supported by the device.

17. The non-transitory computer readable medium of claim 14, wherein to obtain the one or more ciphers includes to obtain the one or more ciphers from a third party server.

18. The system of claim 10, wherein each of the one or more ciphers is associated with a service that is supported by the device on the network, and the notification is generated based on whether each of the one or more ciphers that are associated with the service are quantum-safe.

19. The non-transitory computer readable medium of claim 14, wherein each of the one or more ciphers is associated with a service that is supported by the device on the network, and the notification is generated based on whether each of the one or more ciphers that are associated with the service are quantum-safe.

* * * * *